United States Patent [19]

Chun

[11] Patent Number: 5,631,884

[45] Date of Patent: May 20, 1997

[54] COMPACT-DISC CHANGER USING THE SAME OPTICAL PICKUP DEVICE USED FOR PLAYING DISC FOR SENSING ROULETTE POSITION

[75] Inventor: Kyu-sam Chun, Kyungki-do, Rep. of Korea

[73] Assignee: Samsung Electronics Co., Ltd., Kyungki-do, Rep. of Korea

[21] Appl. No.: 388,768

[22] Filed: Feb. 15, 1995

[30] Foreign Application Priority Data

Feb. 16, 1994 [KR] Rep. of Korea .................. 94-2731

[51] Int. Cl.⁶ ............................................. G11B 17/22
[52] U.S. Cl. ............................................. 369/37; 369/75.2
[58] Field of Search ................................. 369/37, 30, 75.1, 369/75.2, 54, 58, 36; 360/98.04, 98.06

[56] References Cited

U.S. PATENT DOCUMENTS 5,193,079  3/1993  Ko et al. ............................ 369/37
5,293,362  3/1994  Sakurai et al. ..................... 369/37

Primary Examiner—Stuart S. Levy
Assistant Examiner—Kevin M. Watkins
Attorney, Agent, or Firm—Allen LeRoy Limberg

[57] ABSTRACT

A roulette-type disc changer includes a tray, a roulette rotatably mounted on the tray, on the upper surface of which a plurality of discs are loaded, and a pickup portion installed below the tray and having a deck on which an optical pickup for emitting a laser beam moves, for reproducing information from the discs, wherein a plurality of throughhole groups are formed in a predetermined pattern along a circumference of the roulette, a light throughhole is formed in the tray at a position corresponding to that of the throughholes of the roulette, the deck of the pickup portion is extended such that the optical pickup can sufficiently move to the position of the light throughhole, and a reflecting device is installed such that the laser beam emitted from the optical pickup can pass through the light throughhole and the throughholes of the roulette and be reflected from the reflection means.

4 Claims, 2 Drawing Sheets

COMPACT-DISC CHANGER USING THE SAME OPTICAL PICKUP DEVICE USED FOR PLAYING DISC FOR SENSING ROULETTE POSITION

BACKGROUND OF THE INVENTION

The present invention relates to a roulette-type disc changer, and particularly to a roulette-type disc changer which can sense a disc number using a laser beam from an optical pickup, without using an extra photo sensor.

Along with the advent of the compact disc (CD), various types of CD players have been introduced. While some such players accommodate (as for reproducing) a single disc, a CD player system in which a plurality of discs can be accommodated has been developed recently, which is called a roulette-type disc changer. One example of a conventional roulette-type disc changer is shown in FIGS. 1 and 2, where FIG. 1 is a plan view thereof and FIG. 2 is a cross-sectional view which is cut along line II—II of FIG. 1.

Referring to FIGS. 1, 2 and 3, the conventional roulette-type disc changer 10 comprises a round tray 11 having a predetermined thickness and width, and a round roulette 12 which is installed on a rotary shaft 16 located at the center of tray 11, to rotate the roulette 12 thereon. A plurality of L-shaped holder chucks 11a for supporting a plurality of discs 13 are provided around the circumference of tray 11 at a predetermined interval from each other. Fixing members 13s for preventing disc separation from the roulette are installed in each chuck 11a, so as to be positioned over the center of each disc 13. Photo sensors 15 are installed in a circular pattern on the upper surface of tray 11, for sensing disc-number sensing interrupters 14a, 14b and 14c and a roulette-stop sensing interrupter 14d which are arranged in a corresponding circular pattern on the lower surface of roulette 12, as shown in FIG. 3.

In the operation of the above conventional roulette-type disk changer, when roulette 12 loaded on tray 11 rotates, the disc-number sensing interrupters 14a, 14b and 14c and roulette-stop sensing interrupter 14d pass above photo sensors 15 installed between tray 11 and roulette 12. Accordingly, each interrupter intercepts the light of photo sensors 15 so that the disc number can be sensed by the different number of light interceptions, which is in accordance with the number of interrupters 14a, 14b or 14c. The stop position of roulette 12 is detected by roulette-stop sensing interrupter 14d.

However, the above-described system for sensing disc number and roulette stop position requires an additional set of photo sensors and interrupters for each disc. Therefore, the manufacturing cost of a CD player is increased accordingly and the interrupter formation is troublesome.

SUMMARY OF THE INVENTION

To solve the above problems, it is an object of the present invention is to provide a roulette-type disc changer which is capable of sensing disc number through the utilization of a laser beam emitted from an optical pickup, without using an additional photo sensor.

To attain the above object, there is provided a roulette-type disc according to the present invention comprising a tray; a roulette rotatably mounted on the tray, on the upper surface of which a plurality of discs are loaded; and a pickup portion installed below the tray and having a deck on which an optical pickup for emitting a laser beam moves, for reproducing information from the discs, wherein a plurality of throughhole groups are formed in a predetermined pattern along a circumference of the roulette, a light throughhole is formed in the tray at a position corresponding to that of the throughholes of the roulette, the deck of the pickup portion is extended such that the optical pickup can sufficiently move to the position of the light throughhole, and reflection means is installed such that the laser beam emitted from the optical pickup can pass through the light throughhole and the throughholes of the roulette and be reflected from the reflection means.

Also, a sensor switch for limiting the outermost movement of the optical pickup is provided on the deck of the pickup portion.

With such structural characteristics as described above, disc number recognition and proper roulette stopping are possible through the utilization of the laser beam of the pickup apparatus, without having an extra sensor for the disk number sensing and the stopping of the roulette, respectively, as in the prior art. Thus, manufacturing costs are reduced and labor savings can be achieved, due to the decrease in the number of components.

DETAILED DESCRIPTION OF THE INVENTION

Figure 1:
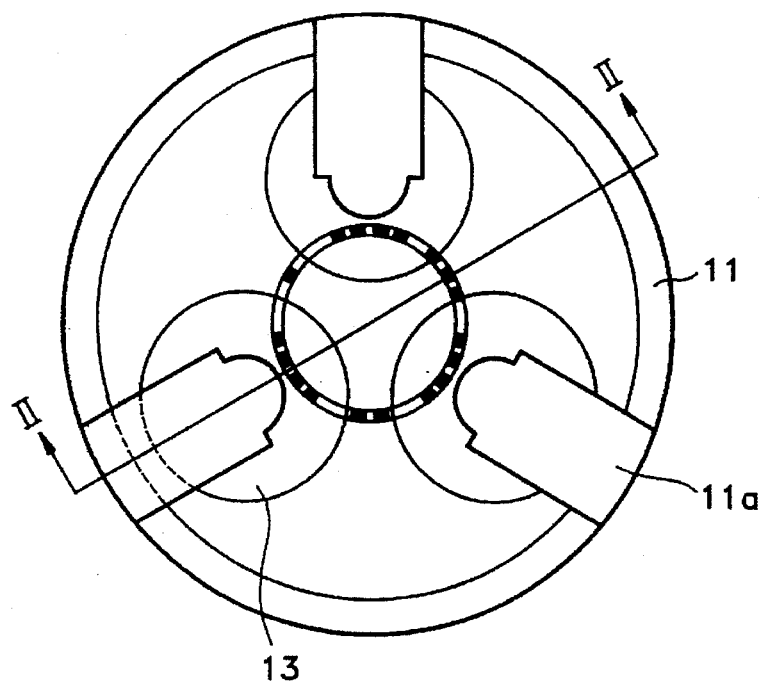
FIG. 1 is a plan view of a conventional roulette-type disc changer.
Figure 2:
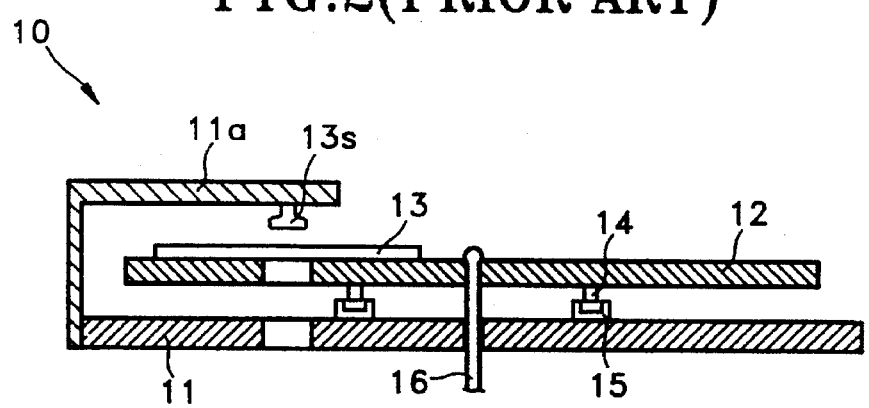
FIG. 2 is a cross-sectional view cut along line II—II of FIG. 1.
Figure 3:
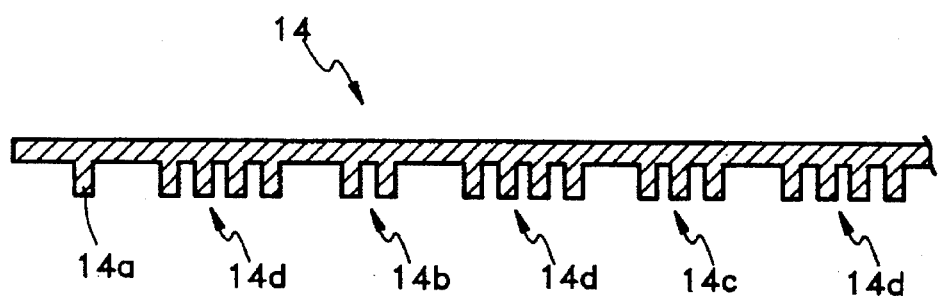
FIG. 3 is a view of the disc-number and roulette-stop sensing interrupters corresponding to the photo sensors of FIG. 2.
Figure 4:
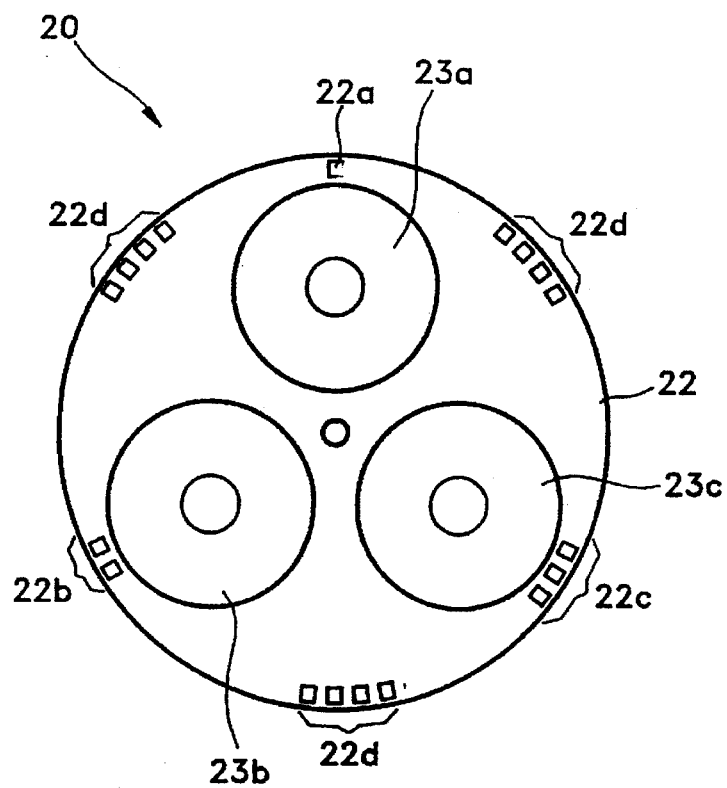
FIG. 4 is a plan view of a a roulette of a roulette-type disc changer according to the present invention.

Referring to FIG. 4, a roulette-type disc changer 20 of the present invention has throughhole sets 22a, 22b, 22c and 22d of a predetermined spacing and interval, which are formed along the circumference of a round roulette 22. Specifically, a plurality n of throughhole groups 22a, 22b and 22c for sensing each disc number n are formed near the roulette's perimeter in correspondence with a plurality n of discs 23a, 23b and 23c arranged with the mutual interval of 360°/n which, for a three-disc disc changer, is 120°. Also, throughhole groups 22d for sensing the stop position for roulette 22 are similarly formed between throughhole groups 22a, 22b and 22c.

Figure 5:
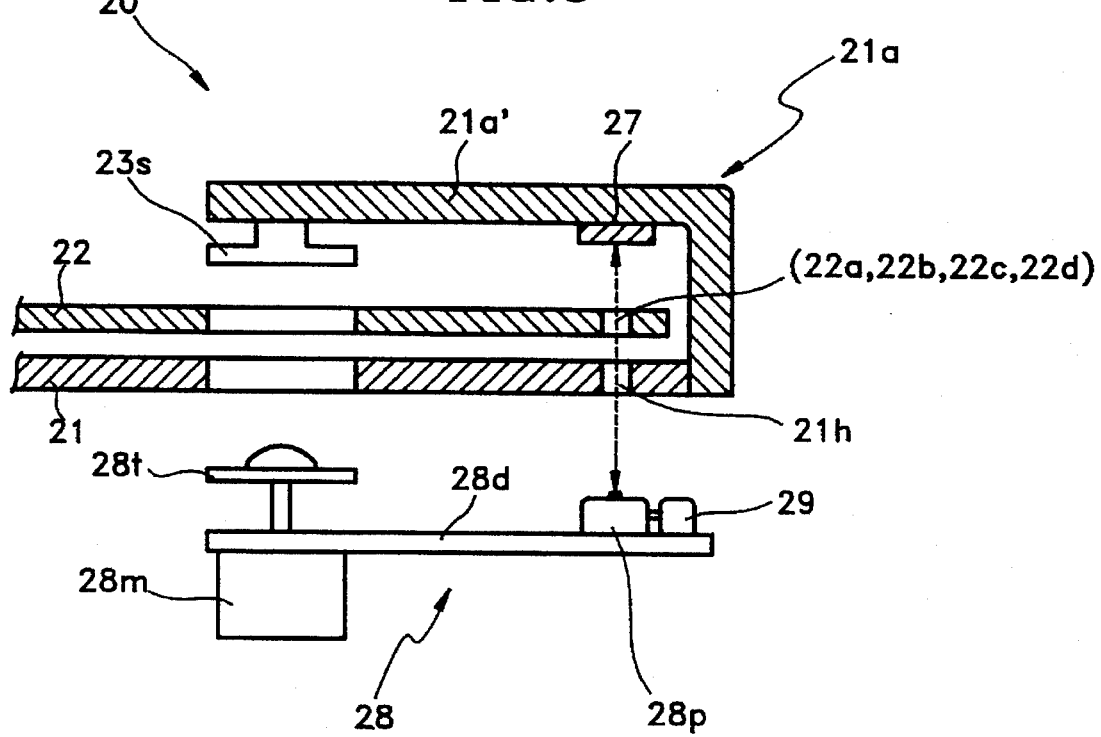
FIG. 5 is a schematic cross-sectional view showing the assembled state of the roulette, tray and chucks of FIG. 4.

Referring to FIG. 5, L-shaped holder chucks 21a are coupled to the circumferential surface of a tray 21. A fixing member 23s for preventing disc separation from the roulette is installed in a horizontal member 21a' of each holder chuck 21a, so as to be positioned over the center of a disc. A reflection plate 27 is provided on the bottom surface of a horizontal member 21a' of holder chuck 21a at a position corresponding to one of the throughholes (22a–22d) of roulette 22. The reflection plate 27 serves to reflect the laser beam emitted from an optical pickup 28p which is located below tray 21. A light throughhole 21h for passing the laser beam from optical pickup 28p is provided in tray 21 at the position corresponding to the throughholes (22a–22d) of roulette 22. A guiding rail (not shown) is provided in the deck 28d for the horizontal movement of optical pickup 28p on deck 28d, and a sensor switch 29 for limiting the outermost movement of the optical pickup 28p is provided on an extended portion of deck 28d. Here, sensor switch 29 detects when the proper position of optical pickup 28p along the guiding rail has been reached; that is, the position directly below reflection plate 27. In FIG. 5, a reference symbol 28m indicates a motor for disc rotation and 28t is a turn table on which the discs are loaded.

Now, operation of the roulette-type disc changer having the above structure according to the present invention will be explained in detail, with reference to FIG. 5.

Once roulette-type disc changer 20 is activated so that roulette 22 rotates, deck 28d descends vertically while optical pickup 28p of pickup portion 28 moves to the outer circumference of deck 28d so as to be positioned in line with the throughhole of tray 21. When optical pickup 28p reaches the proper position, sensor switch 29 sends a detection signal to a control unit (not shown) which stops the movement of optical pickup 28p and sets the laser beam focussing lens installed therein to a neutral position so that the emitted laser beam can be used for throughhole detection.

In such a condition, with roulette 22 rotating, the laser beam is passed and interrupted according to the pattern of the disc-number-sensing throughholes 22a, 22b and 22c formed in roulette 22, creating a pulse signal which can be decoded. Accordingly, the respective disc number is determined.

In a similar manner, the received laser beam pulse signal can determine the exact position for stopping the roulette. Here, the passage and interruption of the laser beam according to the formation of the roulette-stop-sensing throughholes 22d at predetermined locations around roulette 22, signify proper roulette stopping positions. Once roulette 22 is stopped at an exact position, deck 28d ascends vertically and optical pickup 28p is moved back in order to execute a normal operation for disc playback.

As described above, the roulette-type disc changer according to the present invention does not include an extra sensor for sensing the disc number and the stop position of the roulette, and utilizes the laser beam of the optical pickup to achieve the same object. Therefore, the added cost with respect to the installation of an extra sensor is eliminated and manufacturing cost can be reduced accordingly.

It will be understood by those skilled in the art from the foregoing description of a preferred embodiment of the disclosed device that various changes and modifications may be made in the invention without departing from the spirit and scope thereof. For example, although the present invention has been described with reference to a three-disc CD player, it can be applied to a system accommodating any number of discs. Further, though the drawings show a varying number of holes to determine proper system operation, any hole pattern is possible as long as the reflected light is received as a recognizable pulse signal corresponding to roulette position.

What is claimed is:

1. A roulette-type disc changer comprising:

a tray;

a roulette rotatably mounted on said tray, said roulette having an upper surface distal from said tray for loading a plurality of discs thereon, having a lower surface opposite its said upper surface and proximate to said tray, and having a rim at a circumference thereof;

a pickup portion installed below said tray and having a deck on which moves an optical pickup for emitting a laser beam and sensing the laser beam reflected back thereto as from one of said plurality of discs, for reproducing information from the discs; and a reflector positioned above the upper surface of said roulette, wherein a plurality of throughhole groups each having at least one light throughhole therein are formed in a predetermined pattern along a circular path near the circumference of said roulette and separate from where said plurality of disks are loaded, wherein each light throughhole in said throughhole groups extends between the upper and lower surfaces of said roulette at a prescribed distance from its rim, wherein an light throughhole is formed in said tray at a position corresponding to that of the throughholes of said roulette, wherein the deck of said pickup portion is extended such that said optical pickup can move sufficiently close to the rim of said roulette as to be positioned beneath the additional light throughhole in said tray, and wherein said reflector is positioned such that the laser beam emitted from said optical pickup can pass through the additional light throughhole in said tray and one of the groups of throughholes of said roulette and be reflected by said reflector back to said optical pickup, thereby allowing a disc number or a disc stopping position or both to be sensed by said optical pickup.

2. A roulette-type disc changer as claimed in claim 1, wherein the deck of said pickup portion is provided with means for limiting the outermost movement of the optical pickup.

3. A roulette-type disc changer as claimed in claim 1, further comprising a holder chuck coupled to said tray, for supporting and fixing a disc loaded on said roulette.

4. A roulette-type disc changer as claimed in claim 3, wherein said reflector is attached to said holder chuck.

* * * * *